Nov. 8, 1938.  R. J. THOMAS  2,136,157
MOTOR VEHICLE
Filed June 19, 1935
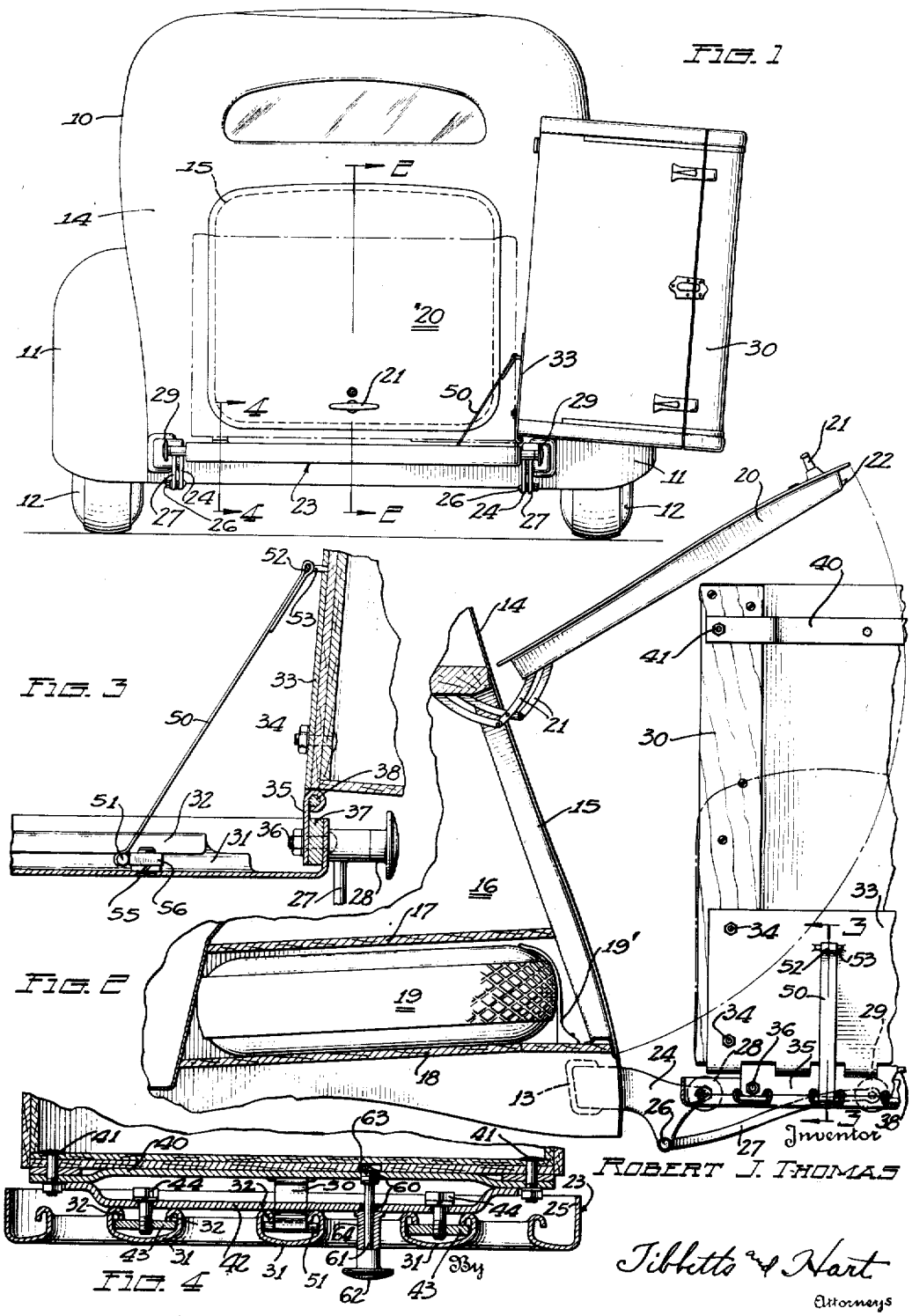

Patented Nov. 8, 1938

2,136,157

UNITED STATES PATENT OFFICE 2,136,157

MOTOR VEHICLE

Robert J. Thomas, Philadelphia, Pa., assignor to Packard Motor Car Company, Detroit, Mich., a corporation of Michigan Application June 19, 1935, Serial No. 27,325

2 Claims. (Cl. 224—29)

This invention relates to motor vehicles and more particularly to rack trunks and their application to motor vehicles.

Trunk racks are usually mounted to extend rearwardly from the rear body panel and are supported by bracket means secured to the rear end of the vehicle main frames. Some bodies are designed with a storage compartment at the rear to which access is had through an opening in the rear panels. Until recently such openings have been high enough to permit the closure means to clear a rearwardly mounted trunk so that compartment accessibility has presented no problem. Recent body design has increased the possible length of the bottom portion of rear storage compartments so that the opening in the rear panel can be substantially co-extensive with the adjacent compartment space thus allowing increased storage capacity and accessibility to an extent that spare tires can be carried flat in the bottom of the compartments. The rear trunks interfere with the accessibility of the lower part of such compartments and prohibit swinging of the closure means from the openings unless dismounted from the racks, and obviously this dismounting of trunks is objectionable for several reasons.

An object of this invention is to provide a trunk mounting, for a vehicle of the above mentioned type, which allows the trunk to be shifted on a rack, without detachment, so that it will not interfere with access to the rear compartment or with swinging of a closure door to and from the opening in the rear panel of a motor vehicle body.

Another object of the invention is to mount a trunk on a rearwardly extending rack so that it can be readily swung entirely out of the path of the rear storage compartment door when being opened and closed.

A further object of the invention resides in the details of mechanism for associating a trunk with a rack so that it can be readily tilted or fixed thereon.

Other objects of the invention will appear from the following description taken in connection with the drawing, which forms a part of this specification, and in which:

Fig. 1 is an elevation of the rear end of a motor vehicle with which the invention is incorporated, the trunk being shown in extreme tilted position by full lines and shown in fixed normal position by dotted lines.

Fig. 2 is a sectional view of the same taken on line 2—2 of Fig. 1, the trunk in this instance also being shown by full lines in its tilted position and by dotted lines in its normal position.

Fig. 3 is a sectional view of the trunk and rack taken on line 3—3 of Fig. 2 showing the hinge and strap connection of the trunk with the rack.

Fig. 4 is a sectional view taken on line 4—4 of Fig. 1 illustrating the support and hold down means between the rack and the trunk.

The invention is shown associated with a motor vehicle body 10 having the conventional rear fenders 11 extending over the rear wheels 12, the body being mounted on a conventional main frame structure as indicated at 13.

The rear panel 14 of the body extends at a rearwardly extending angle toward the bottom and is formed with an opening 15 to permit access to a storage compartment 16 formed in the rear end of the body. This storage compartment extends vertically from a short distance below the rear window to a short distance above the main frame and has horizontally extending floors 17 and 18 therein. Between the floors is a space into which a spare wheel 19 can be inserted and removed in a direction longitudinally of the vehicle when clamp 19' is removed and the space above the floor 17 can be utilized for baggage and other articles which it may be desired to carry. The opening in the panel is substantially co-extensive with the storage compartment in advance thereof so that the spare wheel can readily be removed or placed therein and likewise the articles stored in the upper part of the compartment can be readily inserted or removed.

For closing the opening 15 there is a door 20 which is connected along one edge to the body by hinge means 21 in a conventional manner. The door must swing partly in a path extending rearwardly of the rear body panel when being opened or closed. The door is provided with the usual handle 21 and latch 22.

A trunk rack, indicated generally at 23, extends rearwardly from below the opening 15. This rack is mounted upon a pair of brackets 24 suitably secured at their forward ends to a rear portion of the main frame 13. The rack includes a continuous rectangular outer frame 25 arranged to lie between the brackets 24 and suitably connected thereto by pivot means 26. There is also a pair of rearwardly extending arms 27 pivoted at their forward ends at 28 to the brackets and pivoted at 29 at their rear ends to the sides of the rack frame. It will be understood that the rack can be swung up into a vertical position when not in use and can be placed in a horizontal position, as shown in the drawing, when the trunk 30 is mounted thereon. The rack is formed with spaced channel portions 31 extending in a direction transversely of the vehicle, such channel members being open along their upper portion and having the side edges 32 thereof bent downwardly into the channel.

The trunk is arranged to be connected with the rack so that it can be readily shifted from behind the opening 15 and out of the swinging path of the rear compartment door without being disconnected when access to the rear compartment is desired. To this end hinge means is employed to connect one edge of the rack with one end of the trunk and the pivot point of this hinge means is outside of the rear compartment opening. A hinge plate 33 is secured by bolts 34 to the bottom of the trunk at one end thereof and a hinge plate 35 is secured by bolts 36 to an end of the rack frame, there being a spacer 37 interposed between such hinge plate 35 and the rack frame. These hinge plates are formed with interfitting spaced eyes through which a hinge pin 38 extends.

The opposite end of the trunk has a shoe 40 secured to the bottom thereof by bolts 41 and is arranged to rest against a supporting bar 42 when the trunk is in fixed or normal position upon the rack. The shoe and the supporting bar are arranged across the trunk and the rack in a direction extending longitudinally of the vehicle and with the hinge leaf 33 they connect the trunk with the rack. Anchor bars 43 are located in two of the channels 31 and are of such width that they extend beneath and across the downturned flanges 32 thereof. Bolts 44 extend through the supporting bar 42 and are threaded into the anchor bars 43 to secure the supporting bar on the rack. These anchor members can be slid endwise into the channels and removed in the same manner when the bolts 44 are detached therefrom so that the supporting bar 42 can thus be attached to or detached from the rack.

Endwise tilting of the trunk is limited by movable means which extends between the rack and the trunk. In the present instance there is a strap member 50, preferably in the form of a strip of metal which is welded at one end to a pin 51 arranged to slide in one of the channels 31 of the rack beneath and downturned flanges 32. The other end of the strap is folded upon itself and is welded to form a loop 52 which engages anchor means on the trunk, shown as a pressed out portion 53 of the hinge leaf 33. Means is provided to limit the sliding movement of the pin 51 in its channel in one direction and, in the present instance, consists of a screw 55 projecting upwardly through the bottom of the channel and having threaded thereon within the channel a nut 56. When the nut and screw are removed, then of course there is no interference to the pin movement past the end of the channel so that in this way the strap can be assembled or removed from the rack. This strap means is arranged in a relation behind the rear body panel so that it will not interfere with the opening and closing of the door 20 when the trunk is tilted endwise.

In order to hold the trunk down on the rack when the door is closed there is provided detachable securing means carried by the rack. The shoe 40 and the supporting bar 42 are formed with aligned threaded openings 60 and a retainer element extends therethrough. This element consists of a shank 61 having a knob 62 at one end and a threaded head 63 at the other end. The threaded head is screwed through the opening 60 in the supporting bar and there is a spacer 64 between the knob and the supporting member to limit the movement of the shank toward the shoe. When it is desired to retain the trunk tightly on the rack the threaded head 63 is screwed into the opening 60 in the shoe and when it is desired to tilt the trunk then the threaded head 63 is unscrewed from such opening. It will be seen that the threaded head of the shank will not fall through the opening 60 in the supporting bar when it is released from the opening in the shoe and thus the detachable securing means is fixed with the rack so that it will not become displaced therefrom unless so desired.

With the mounting means herein described the trunk can be readily fixed to the rack or can be released so that it can be tilted clear of the storage compartment opening.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle, the combination of a rack fixed to extend rearwardly of said vehicle, said rack being formed with transversely extending channels having downwardly inturned front and rear edges, a supporting bar resting on said channels at one end of said rack, anchor means in said channels extending beneath and across the downturned flanges in said channels, means detachably securing said supporting bar to said anchor means, a trunk hingedly anchored on the end of said rack remote from said bar, and a shoe fixed to the bottom of said trunk in a relation to rest upon said supporting bar when the trunk is in its normal position on the rack.

2. In a motor vehicle, the combination of a rack fixed to and extending rearwardly from said vehicle, said rack having a channel extending transversely thereof and terminating in edge portions turned inwardly of and downwardly into said channel, a trunk hinged at its end on said rack, means for limiting the tilting movement of the trunk comprising a pin slidable in said channel beneath the inturned flanges therein, a strap connecting the pin with the bottom of said trunk, and stop means in said channel with which said pin engages to limit the hinged movement of said trunk.

ROBERT J. THOMAS.